United States Patent
Brown et al.

(10) Patent No.: US 11,874,861 B2
(45) Date of Patent: Jan. 16, 2024

(54) RETRAINING A CONVERSATION SYSTEM BASED ON NEGATIVE FEEDBACK

(71) Applicant: International Business Machines Corporation, Armonk, NY (US)

(72) Inventors: Jason M. Brown, Cary, NC (US); Andrew R. Freed, Cary, NC (US); Aaron T. Smith, Raleigh, NC (US); Joshua S. Allen, Durham, NC (US); Ryan S. Brink, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1279 days.

(21) Appl. No.: 16/415,545

(22) Filed: May 17, 2019

(65) Prior Publication Data

US 2020/0364511 A1    Nov. 19, 2020

(51) Int. Cl.
| | |
|---|---|
| *G06F 40/35* | (2020.01) |
| *G06F 16/332* | (2019.01) |
| *G06N 3/08* | (2023.01) |
| *G06F 40/216* | (2020.01) |
| *G06F 40/30* | (2020.01) |
| *G06N 3/006* | (2023.01) |
| *G06N 3/084* | (2023.01) |
| *G06V 10/82* | (2022.01) |
| *G06F 18/21* | (2023.01) |

(Continued)

(52) U.S. Cl.
CPC ...... *G06F 16/3329* (2019.01); *G06F 18/2178* (2023.01); *G06F 18/24765* (2023.01); *G06F 18/41* (2023.01); *G06F 40/216* (2020.01);
*G06F 40/30* (2020.01); *G06F 40/35* (2020.01); *G06N 3/006* (2013.01); *G06N 3/08* (2013.01); *G06N 3/084* (2013.01); *G06V 10/82* (2022.01)

(58) Field of Classification Search
CPC ...... G06F 40/35; G06F 40/30; G06F 16/3329; G06F 40/56; G06F 16/248
See application file for complete search history.

(56) References Cited

U.S. PATENT DOCUMENTS

| | | |
|---|---|---|
| 7,292,976 B1 | 11/2007 | Hakkani-Turmazin |
| 9,390,374 B2 | 7/2016 | Andrejko et al. |

(Continued)

OTHER PUBLICATIONS

Zue et al., Conversational Interfaces: Advances and Challenges, Published in Proceedings of the IEEE, vol. 88, No. 8, pp. 1166-1180, Aug. 2000.

(Continued)

*Primary Examiner* — Wilson W Tsui
(74) *Attorney, Agent, or Firm* — Aaron Pontikos

(57) ABSTRACT

A method retrains a cognitive interaction information system. One or more processors monitors an interactive communication between a user and the cognitive interactive information system. The processor(s) identifies an incorrect answer returned by the cognitive interactive information system to a question asked by the user; reevaluates the question utilizing alternative intent classifications to form alternative answers; and presents the alternative answers to the user. The processor(s) receive a selection from the alternative answers from the user; updates processing rules to generate updated processing rules that are based on the selection; and retrains the cognitive interaction information system based on the updated processing rules.

17 Claims, 11 Drawing Sheets

(51) Int. Cl.
*G06F 18/40* (2023.01)
*G06F 18/24* (2023.01)

(56) References Cited

U.S. PATENT DOCUMENTS

| | | | | |
|---|---|---|---|---|
| 10,692,006 | B1* | 6/2020 | Zhang | G06N 3/08 |
| 10,811,006 | B2* | 10/2020 | Yamagami | G06F 40/30 |
| 2005/0004788 | A1* | 1/2005 | Lee | G06F 3/038 |
| | | | | 703/22 |
| 2014/0122618 | A1 | 5/2014 | Duan | |
| 2016/0071517 | A1* | 3/2016 | Beaver | G06F 40/35 |
| | | | | 704/9 |
| 2016/0125751 | A1 | 5/2016 | Barker et al. | |
| 2016/0148114 | A1* | 5/2016 | Allen | G06N 5/02 |
| | | | | 706/11 |
| 2016/0314114 | A1 | 10/2016 | Barbetta et al. | |
| 2017/0243107 | A1* | 8/2017 | Jolley | G06F 16/951 |
| 2018/0131645 | A1 | 5/2018 | Magliozzi | |
| 2018/0150607 | A1 | 5/2018 | MacLeod et al. | |
| 2018/0260384 | A1 | 9/2018 | Pasupalak et al. | |
| 2018/0308006 | A1 | 10/2018 | Atkinson | |
| 2018/0358001 | A1* | 12/2018 | Amid | G06F 16/3329 |
| 2018/0367480 | A1* | 12/2018 | Housman | G06F 40/247 |
| 2019/0115027 | A1* | 4/2019 | Shah | G10L 17/22 |
| 2019/0138600 | A1* | 5/2019 | Krishnan | G10L 15/22 |
| 2019/0371296 | A1* | 12/2019 | Iwase | G10L 15/30 |
| 2020/0097496 | A1* | 3/2020 | Alexander | G06F 16/355 |
| 2020/0184956 | A1* | 6/2020 | Agarwal | G10L 15/07 |
| 2020/0311738 | A1* | 10/2020 | Gupta | G06F 16/22 |
| 2020/0342032 | A1* | 10/2020 | Subramaniam | G10L 15/063 |

OTHER PUBLICATIONS

P. Mell et al., "The Nist Definition of Cloud Computing", National Institute of Standards and Technology, Information Technology Laboratory, Sep. 2011, pp. 1-7.

Toor et al., "Question action relevance and editing for visual question answering", Springer Link, Multimedia Tools and Applications, 2019, vol. 78, Issue 3, pp. 2921-2935 (Abstract Only).

\* cited by examiner

US 11,874,861 B2

RETRAINING A CONVERSATION SYSTEM BASED ON NEGATIVE FEEDBACK

BACKGROUND

The present invention relates to the field of artificial intelligence, and specifically to artificial intelligence used in conversation systems. Still more particularly, the present invention relates to optimizing a conversation system by determining an intent and entities in a query from a user based on an answer/response from the user to his/her query.

SUMMARY

In an embodiment of the present invention, a method retrains a cognitive interaction information system. One or more processors monitors an interactive communication between a user and the cognitive interactive information system. The processor(s) identifies an incorrect answer returned by the cognitive interactive information system to a question asked by the user; reevaluates the question utilizing alternative intent classifications to form alternative answers; and presents the alternative answers to the user. The processor(s) receive a selection from the alternative answers from the user; updates processing rules to generate updated processing rules that are based on the selection; and retrains the cognitive interaction information system based on the updated processing rules.

In one or more embodiments, the method(s) described herein are performed by an execution of a computer program product and/or a computer system.

DETAILED DESCRIPTION

Figure 1:
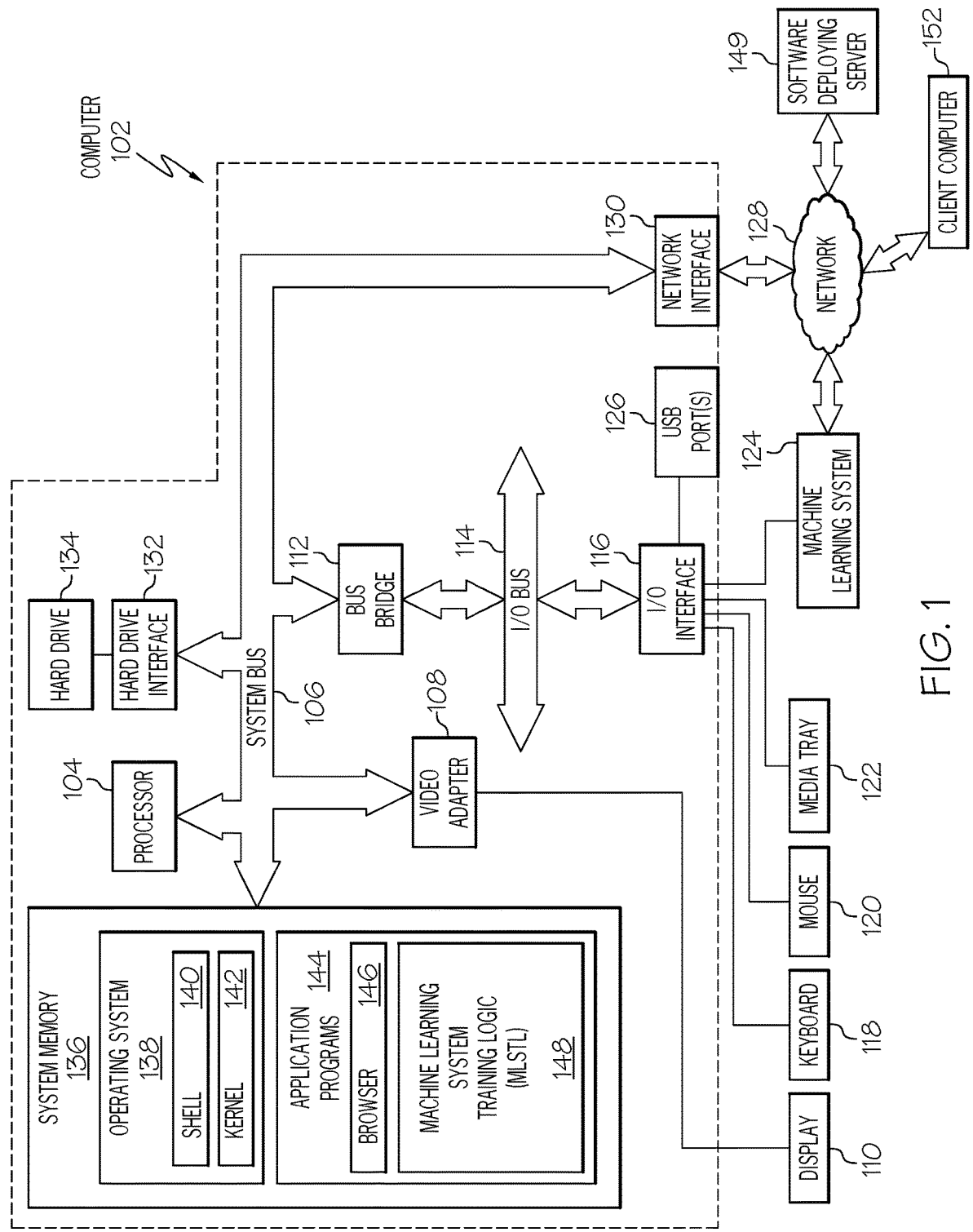
FIG. 1 depicts an exemplary system and network in which the present invention can be implemented.

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also be stored in a computer readable storage medium that, in one or more embodiments, direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that can be utilized by and/or in the implementation of the present invention. Note that some or all of the exemplary architecture, including both depicted hardware and software, shown for, associated with, and/or within computer 102 can be utilized by machine learning system 124 and/or software deploying server 150 and/or client computer 152.

Exemplary computer 102 includes a processor 104 that is coupled to a system bus 106. Processor 104 can utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which can include storage devices such as CD-ROM drives, multi-media interfaces, etc.), a machine learning system 124, and external USB port(s) 126. While the format of the ports connected to I/O interface 116 can be any known to those skilled in the art of computer architecture, in one embodiment some or all of these ports are universal serial bus (USB) ports.

As depicted, computer 102 is able to communicate with a software deploying server 150 and/or the machine learning system 124 using a network interface 130 to a network 128. Network interface 130 is a hardware network interface, such as a network interface card (NIC), etc. Network 128 can be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Machine Learning System Training Logic (MLSTL) 148. MLSTL 148 includes code for implementing some or all of the processes described below, including those described in FIGS. 2-9. In one embodiment, computer 102 is able to download MLSTL 148 from software deploying server 150, including in an on-demand basis, wherein the code in MLSTL 148 is not downloaded until needed for execution. Note further that, in one embodiment of the present invention, software deploying server 150 performs all of the functions associated with the present invention (including execution of MLSTL 148), thus freeing computer 102 from having to use its own internal computing resources to execute MLSTL 148.

Also connected to (or alternatively, as part of) computer 102 is a machine learning system 124. In exemplary embodiments of the present invention, machine learning system 124 is a deep neural network (see FIGS. 4-6), or another type of heuristic artificial intelligence.

Note that the hardware elements depicted in computer 102 are not intended to be exhaustive, but rather are representative to highlight essential components required by the present invention. For instance, computer 102 can include alternate memory storage devices such as magnetic cassettes, digital versatile disks (DVDs), Bernoulli cartridges, and the like. These and other variations are intended to be within the spirit and scope of the present invention.

Cognitive conversational systems use machine learning models to understand and classify the intent of a user's question. They then apply additional context or extracted information to determine the best response for a user. A key aspect of a cognitive based system is providing feedback on a correct or incorrect answer. With a conversational based system, the cognitive classification is not the answer the user is looking for; rather, it is often the first step in getting that answer. This can make retraining a conversational system (e.g., an artificial intelligence based interactive system) particularly challenging for a subject matter expert or cognitive engineer.

A feedback loop for a conversational system starts with the user's input about the answer to their question. The system will then store this positive or negative response to be reviewed later by a subject matter expert (SME). If the feedback is negative, the SME will then provide the system enough information to retrain the system. In a conversational system, this involves correcting the initial classification of the question as understood by the system.

A problem that is not resolved in the prior art is that the correct cognitive classification of intent is not always clear to the SME. While best practices would say that these classifications should be given clear and descriptive names, the classifications (which are really an intermediate step to the answer) often require an understanding of how the system was trained to choose the correct classification. Training such a system is often beyond the scope of expertise of the SME.

The cognitive developers who trained the system often make decisions on the classification for a question. Sometimes it is difficult for the cognitive developers to understand exactly how to map a question to a classification. This process takes an extensive amount of design work and multiple iterations. To truly understand a classification of intent, one would have to review all the questions mapped to the classification. This gives a person a clear understanding of how the system is trained. However, it is very difficult for a SME to gain this level of understanding. Thus, completing this part of the feedback loop can be a very difficult task for the SME who is monitoring responses to answers provided by the conversation system.

Thus, although conversation systems are intended to provide the best response to the question asked, there are many aspects to how the conversation system arrives at an answer. The addition of a word, an alternate context, or a lower confidence classification of intent, could change the answer returned to a user. Furthermore, it is possible to review other likely extracted entities, context, and classification to present the user with responses that the system could have provided.

When reviewing a negative response for a user's question, the SME would benefit if they could focus on what they are good at. The SMEs know the answer to the question and they could quickly choose the correct answer. However, they often do not understand the subtleties of how the system was trained to provide classifications or intents of the questions from the user.

Thus, one or more embodiments of the present invention flip a negative feedback loop on a conversational system from the SME trying to understand how the system is trained to the SME validating what a better answer would be. One key advantage to such a system over the prior art is that the SME is not required to understand the low-level details of the conversation system and how it is trained. Rather, such processes are handled by properly trained artificial intelligence systems, as described in exemplary manner in FIGS. 6-8.

Figure 2:
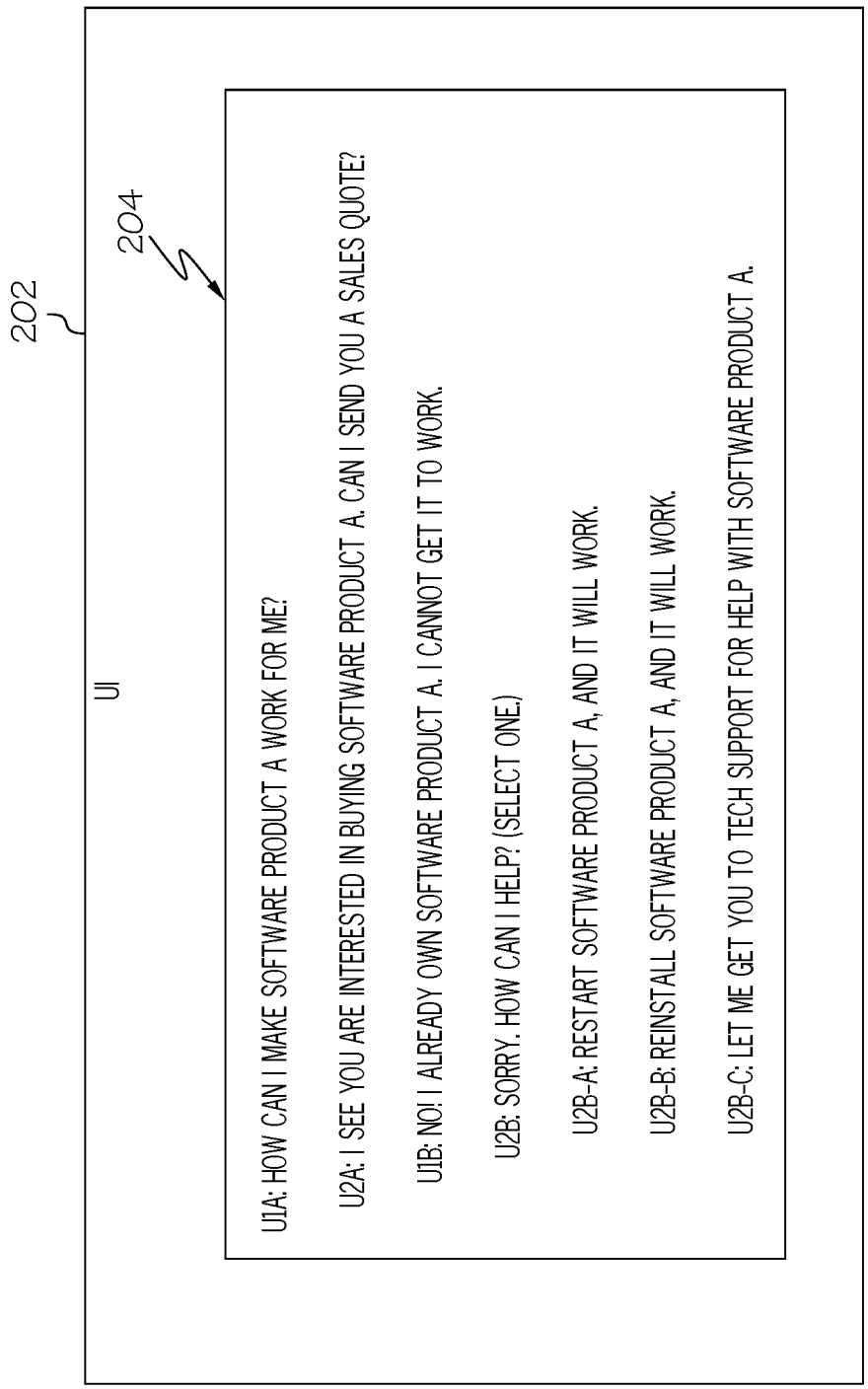
FIG. 2 illustrates an exemplary user interface as used in one or more embodiments of the present invention.

With reference now to FIG. 2, an exemplary user interface (UI) 202 as used in one or more embodiments of the present invention is presented.

Assume that a user (e.g., a user of the client computer 152 shown in FIG. 1) is using a chat screen 204 to have an on-line chat with a chat-bot. The chat bot is software, which is part of MLSTL 148 shown in computer 102 in FIG. 1, that is able to emulate a person having a conversation with the user. Thus, the chat bot is a component of a conversation system. As such, the user and the chat-bot go back and forth exchanging utterances (i.e., verbal utterances such as questions, answers, comments, etc.) through the use of the conversation system.

As shown in FIG. 2, the user begins with a question (utterance U1a—"How can I make Software Product A work for me?"). The chat-bot generates and responds with a response (utterance U2a—"I see you are interested in buying Software Product A. Can I send you a sales quote?"). As shown by the user's utterance U1b ("NO! I already own Software Product A. I cannot get it to work."), the chat-bot's utterance U2a is not what the user wanted to receive. As such, the conversation system (and thus, the chat-bot) recognizes the negative response to chat-bot's utterance U2a, and provides an appropriate response (utterance U2b—"Sorry. How can I help? (Select one.)"), and then provides alternative answers to the user, depicted as utterance U2b-a ("Restart Software Product A, and it will work"); utterance U2b-b ("Reinstall Software Product A, and it will work"); and utterance U2b-c ("Let me get you to tech support for help with Software Product A", which results in connecting the user to the technical support department for Software Product A).

As described herein, one or more embodiments of the present invention are directed to training the chat-bot how to recognize the intent, context, and classification of an utterance, and how to appropriately respond with its own utterance, action, etc., particularly in response to a negative response from a user.

Figure 3:
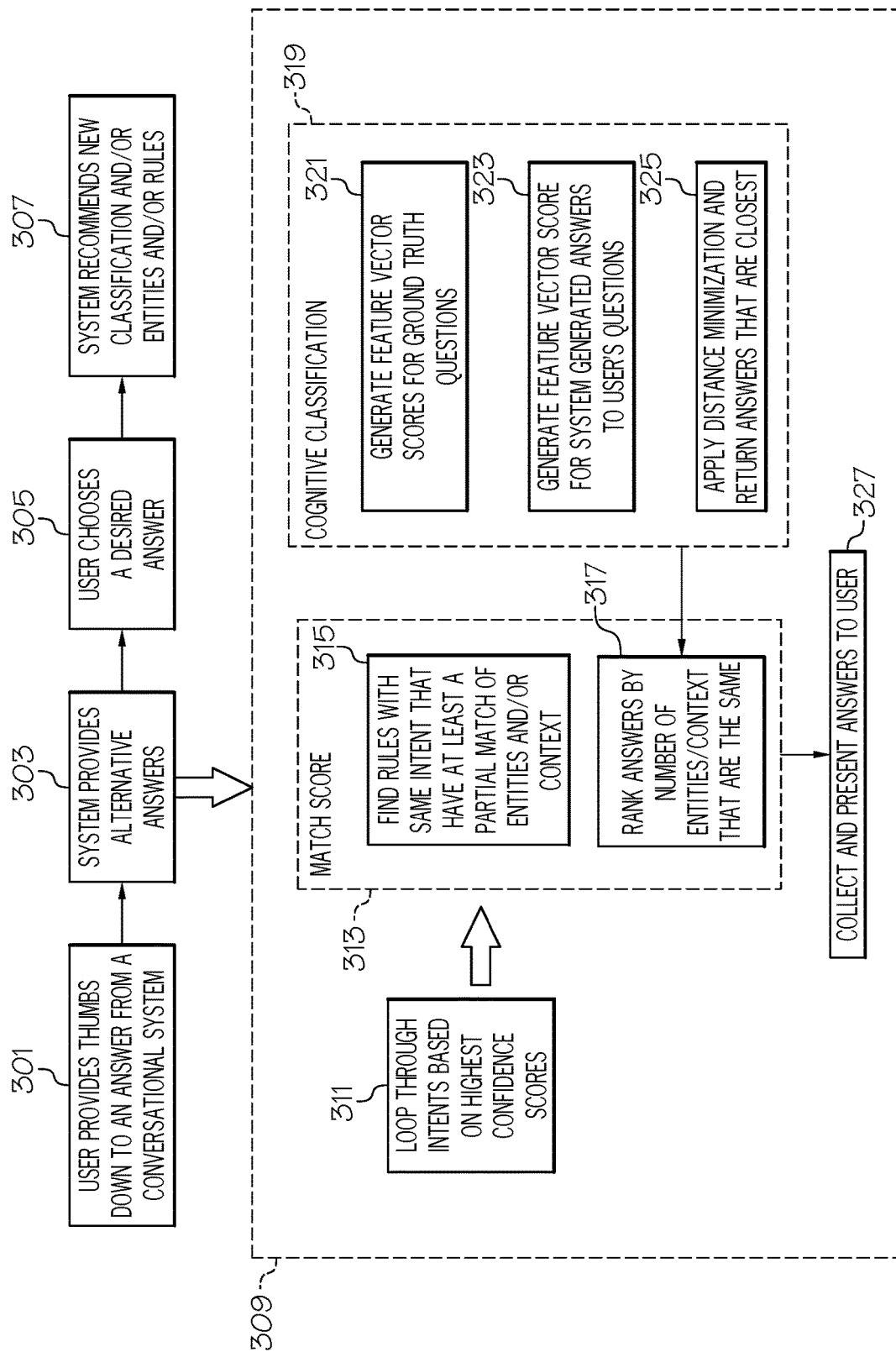
FIG. 3 depicts a high level overview of one or more embodiments of the present invention.

Thus, FIG. 3 depicts a high level overview of one or more embodiments of the present invention to achieve this training.

As shown in block 301, the user (e.g., the person who is using the chat screen 204 in FIG. 2) provides a negative response (as indicated by his/her utterance U1b) to an answer (e.g., the utterance U2a from the chat-bot) from a conversation system (e.g., computer 102 and/or machine learning system 124 shown in FIG. 1).

As shown in block 303, the system (e.g., computer 102 and/or machine learning system 124 shown in FIG. 1) then provides alternative answers/utterances to the user (e.g., utterances U2b-a, U2b-b, U2b-c shown in FIG. 2), which are alternative answers/responses to the user's original question/utterance U1a.

As described in block 305, the user then selects one of the alternative answers/responses to the user's original question/utterance U1a. That is, the user selects one of the utterances U2b-a, U2b-b, U2b-c shown in FIG. 2 and sends it to the system (e.g., by "clicking" on the selected utterance), thus indicating that the selected answer/utterance provides the response/answer that the user was asking for in (or which proved to a successful resolution to) the user's original question/utterance U1a.

As described in block 307, the system then recommends a new classification, entity extraction, and/or rule for the user's original question/utterance U1a and/or a substantially similar question/answer as the user's original question/utterance U1a, in order to be able to appropriately respond in the future to the user's original question/utterance U1a and/or a similar version of the user's original question/utterance U1a.

That is, the classification for the user's original question/utterance U1a and/or a substantially similar question/answer as the user's original question/utterance U1a defines the intent of the question/utterance. Thus, for the example of "How can I make Software Product A work for me?" (the user's original question/utterance U1a), this question/utterance is classified as a request for help in making a product work properly.

The entity extraction for the user's original question/utterance U1a and/or a substantially similar question/answer as the user's original question/utterance U1a defines which terms are to be extracted from the user's original question/utterance U1a and/or similar utterances in the future in order to identify what product is being asked about. In this example, the term/entity to be extracted from the user's question/utterance is "Software Product A" or a similar term describing a particular software product.

The rule for the user's original question/utterance U1a and/or a substantially similar question/answer as the user's original question/utterance U1a is thus modified to not only extract certain terms and provide a classification for the user's original question/utterance U1a and/or a substantially similar question/answer as the user's original question/utterance U1a, but also (in one or more embodiments of the present invention) provides rules for retraining machine learning. For example, and in an embodiment of the present invention, changing the rules for analyzing the user's original question/utterance U1a and/or a substantially similar question/answer as the user's original question/utterance U1a change what intent and/or entities are input into the machine learning system (see FIG. 7 below), etc. In an embodiment of the present invention, these rule changes are made by the machine learning system (see FIG. 8 below).

Returning now to FIG. 3, block 309 provides exemplary details about how the system provides alternative answers to the user (block 303).

Thus, and in an embodiment of the present invention, the system loops through potential intents of the user's question based on highest confidence scores (block 311). That is, the intent of the user's question describes why the user is asking the question. For example, the user's intent in asking the question may be to purchase a product, to get help in correcting a problem, to get directions to a store, to get the hours of operation of a store, to ask for feedback from other customers, etc. Using the process(es) described herein, multiple possible intents for the user's question are ranked according to their highest likelihood of accurately describing the intent of the user's question. (See FIG. 4 below.)

Thereafter, and starting with the highest rated intent and working down through lower rated intents, the intents are sent to a match score operation (block 313).

As shown in block 315, the system finds rules with a same intent that have at least a partial match of entities and/or context. That is, the system is controlled by rules on how to provide alternative answers (block 303). Thus, the system looks for a rule that is for a particular intent that has been sent from block 311 (e.g., a request for technical support), and then matches that intent to an entity (e.g., a particular product named in the utterance/question) described in a rule and a context (e.g., context of the entity in the question). For example, assume that a particular rule states, "This rule is applicable to questions that include the entity of software products, and is applicable to questions in which the context of the software product in that the questions indicate that the question is for technical assistance (e.g., using natural language processing context analysis)". If the question currently being presented by the user is for technical assistance for a software product, then this rule is applicable.

As shown in block 317, the system then matches scores of answers to various questions and ranks them accordingly. The scoring of answers to various questions (i.e., how appropriate various answers are to a certain question) is performed by cognitive classification of the answers as they related to questions, as depicted in block 319.

As shown in block 321, the system generates question feature vector scores for ground truth questions. That is, a "ground truth question" is a question whose intent, context, meaning, and entity identities are known and proven (i.e., are trusted as a "ground truth" description of the question).

Similarly, and as shown in block 323, the system generates an answer feature vector score for a "ground truth answer", which is an answer whose intent, context, meaning, and entity identities are known and proven (i.e., are trusted as a "ground truth" description of the answer) to be a valid answer to a particular question from the user.

As shown in block 325, a vector distance between the question feature vector and the answer feature vector is calculated, in order to determine which answer most closely answers the user's question. That is, the question is described as a vector of intent and entities, which together describe the class of the question. Each proposed answer is also described as a vector of intent and entities, which together describe the class of each proposed answer. The difference in values between the intent and entities (class) of the question and the intent and entities (class) of the answer result in a vector distance between the classes of the questions and answers, thus describing "how closely" each response answers the user's question. A minimum vector distance is applied, such that only answers who classification vectors are close enough to the particular question (i.e., have intents and entities that closely match those of that particular question) are returned to the user.

As shown in block 327, the ranked answers are then returned to the user for his/her selection (see FIG. 2).

As such, each question and each answer is represented by vectors that describe the intent (what the question asking and what the answer is saying) and the entity that the question/answer is about. The vector comparison is thus a scored matching of values for the intents/entities from the various questions and answers.

For example, assume that a particular question asks, "How can I turn on Software Product A?". Assume further that a first answer is "Go to Website X and click the button labeled 'Install Software Product A'"; a second answer is "Click the icon on your user interface that is labeled 'Turn on Software Product B'"; and a third answer is "Click the icon on your user interface that is labeled 'Turn on Software Product A'". As such, the intent of the particular question (asking for help on turning on a software product) matches the intent in the second answer and the third answer. The entity in the particular question (Software Product A) matches the entity shown in the first answer and the third answer. However, only the third answer matches both the intent (help on turning on a software product) and the entity (Software Product A) of the particular question. As such, the vector distance between the third answer and the particular question is less than the vector distance between the particular question and the first answer or the vector distance between the particular question and the second answer. Therefore, the third answer is ranked highest for answering this particular question.

Figure 5:
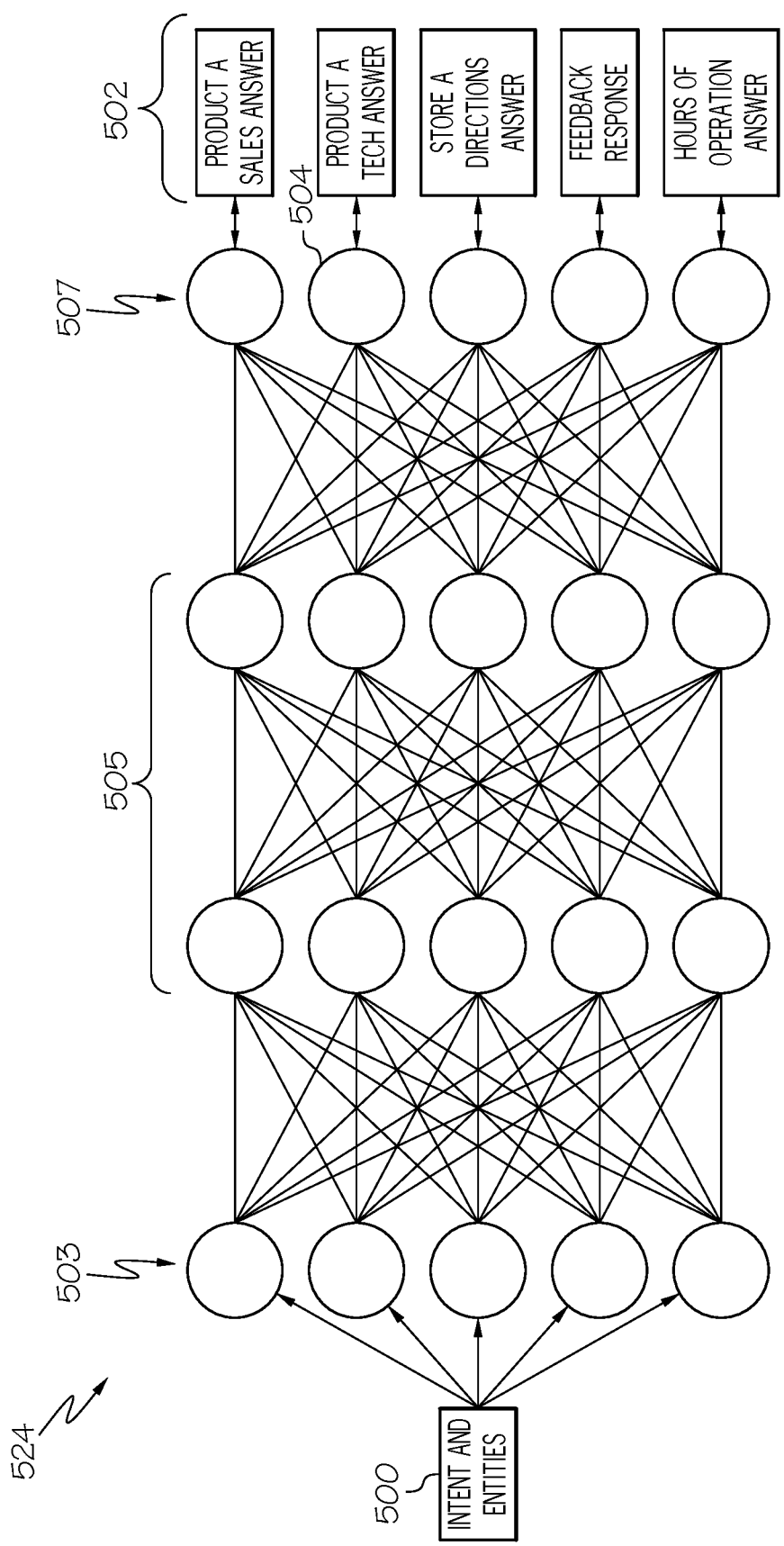
FIG. 5 depicts a deep neural network as used in one or more embodiments of the present invention to select an answer to a query utterance based on the intent and entities from a query utterance.
Figure 6:
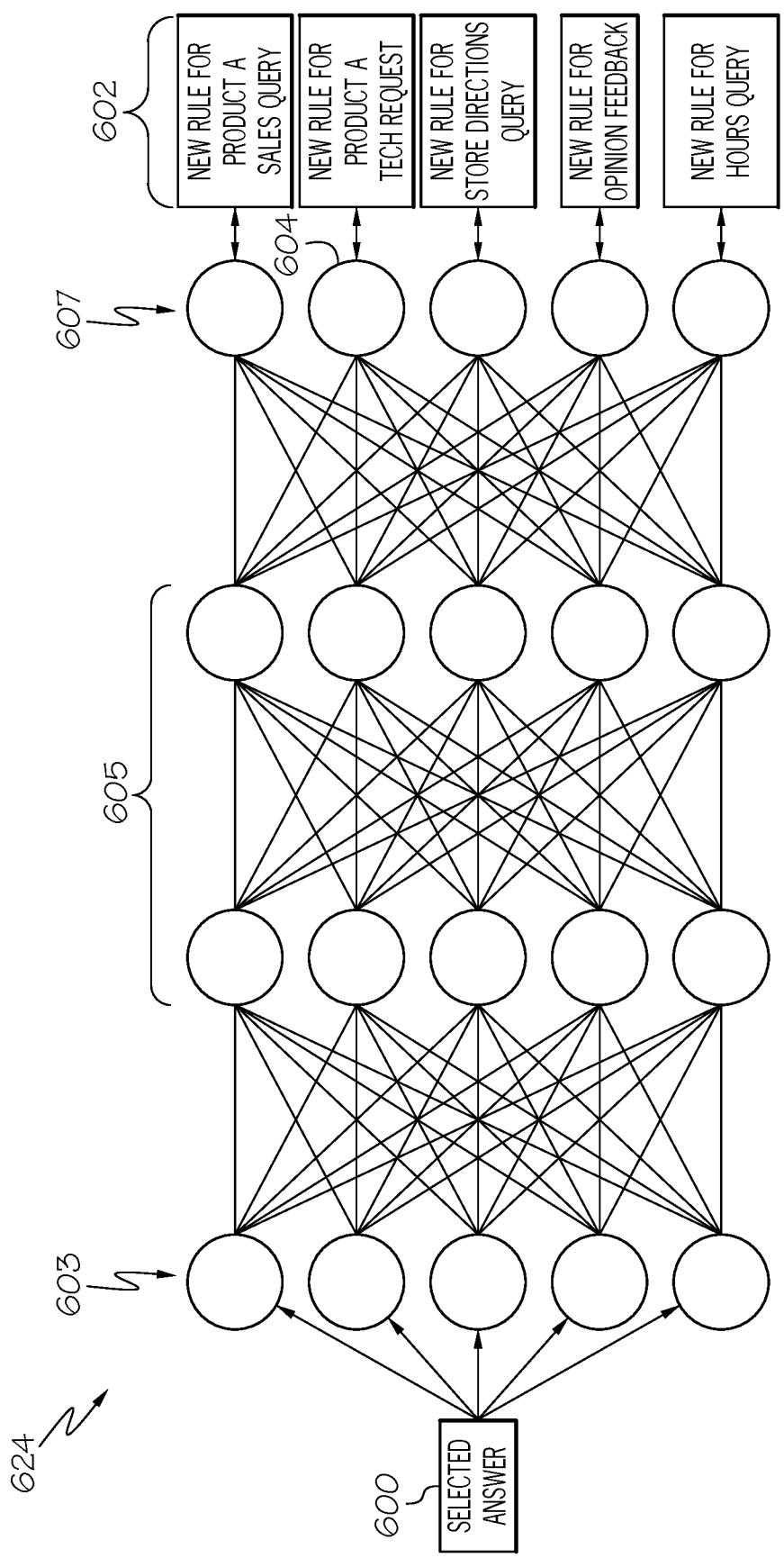
FIG. 6 illustrates a deep neural network as used in one or more embodiments of the present invention to update response rules based on a user-selected answer to a query from the user.

With reference again to FIG. 1, the machine learning system 124 learns how to evaluate questions and answers, in order to identify their intent (FIG. 4), highest ranked answers (FIG. 5), and/or suggestions to changes to rules (FIG. 6). In various embodiments of the present invention, machine learning system 124 can be a neural network such as a Deep Neural Network (DNN) or a Convolutional Neural Network (CNN), and/or any other machine learning system. In an embodiment of the present invention, a DNN is used to evaluate text/numeric data using corrected training text ground truth data, while a CNN is used to evaluate an image using corrected training image ground truth data. In other embodiments of the present invention, any artificial intelligence model (i.e., any type of machine learning system) uses the corrected training ground truth data.

A neural network, as the name implies, is roughly modeled after a biological neural network (e.g., a human brain). A biological neural network is made up of a series of interconnected neurons, which affect one another. For example, a first neuron can be electrically connected by a synapse to a second neuron through the release of neurotransmitters (from the first neuron) which are received by the second neuron. These neurotransmitters can cause the second neuron to become excited or inhibited. A pattern of excited/inhibited interconnected neurons eventually lead to a biological result, including thoughts, muscle movement, memory retrieval, etc. While this description of a biological neural network is highly simplified, the high-level overview is that one or more biological neurons affect the operation of one or more other bio-electrically connected biological neurons.

An electronic neural network similarly is made up of electronic neurons. However, unlike biological neurons, electronic neurons are never technically "inhibitory", but are only "excitatory" to varying degrees.

In a DNN, neurons are arranged in layers, known as an input layer, hidden layer(s), and an output layer. The input layer includes neurons/nodes that take input data, and send it to a series of hidden layers of neurons, in which neurons from one layer in the hidden layers are interconnected with neurons in a next layer in the hidden layers. The final layer in the hidden layers then outputs a computational result to the output layer, which is often a single node for holding vector information.

Figure 4:
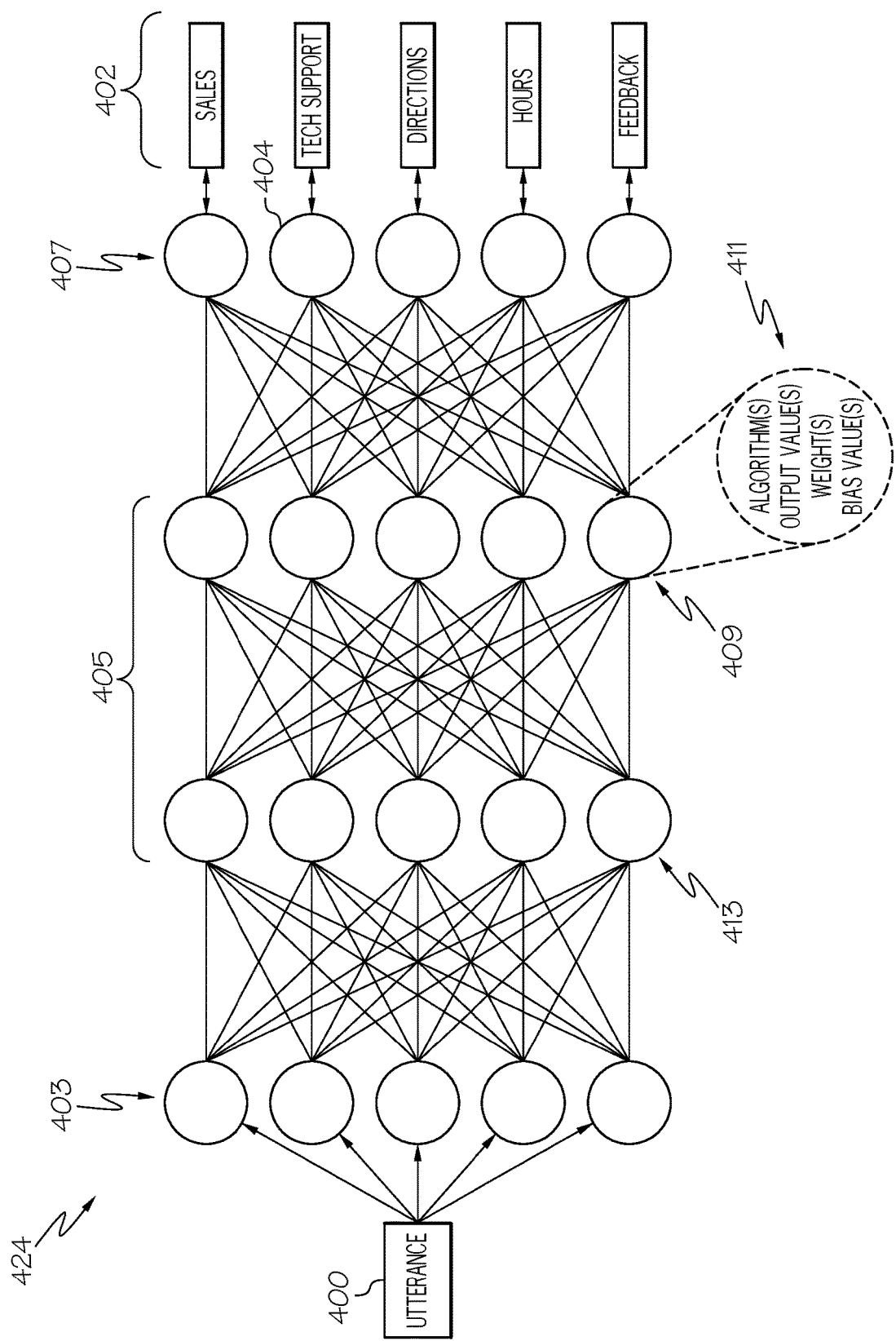
FIG. 4 illustrates a deep neural network as used in one or more embodiments of the present invention to determine an intent of an utterance.

With reference now to FIG. 4, a Deep Neural Network (DNN) 424 used to evaluate data in one or more embodiments of the present invention is presented. For example, utterance 400 is text and/or numeric data that describes a question or an answer, as described above. In FIG. 4, the DNN 424 is used to identify the intent of the utterance 400.

The electronic neurons in DNN 424 are arranged in layers, known as an input layer 403, hidden layers 405, and an output layer 407. The input layer 403 includes neurons/nodes that take input data, and send it to a series of hidden layers of neurons (e.g., hidden layers 405), in which neurons from one layer in the hidden layers are interconnected with all neurons in a next layer in the hidden layers 405. The final layer in the hidden layers 405 then outputs a computational result to the output layer 407, which is often a single node for holding vector information. In an embodiment of the present invention, each neuron in the output layer 407 is associated with a particular label from output labels 402, as shown in FIG. 4.

As just mentioned, each node in the depicted DNN 424 represents an electronic neuron, such as the depicted neuron 409. As shown in block 411, each neuron (including neuron 409) functionally includes at least four features: a mathematical function, an output value, a weight, and a bias value.

The mathematical function is a mathematic formula for processing data from one or more upstream neurons. For example, assume that one or more of the neurons depicted in the middle hidden layers 405 send data values to neuron 409. Neuron 409 then processes these data values by executing the mathematical function (algorithm) shown in block 411, in order to create one or more output values, which are then sent to another neuron, such as another neuron within the hidden layers 405 or a neuron in the output layer 407. Each neuron also has a weight that is specific for that neuron and/or for other connected neurons. Furthermore, the output value(s) are added to bias value(s), which increase or decrease the output value, allowing the DNN 424 to be further "fine tuned".

For example, assume that neuron 413 is sending the results of its analysis of a piece of data to neuron 409. Neuron 409 has a first weight that defines how important data coming specifically from neuron 413 is. If the data is important, then data coming from neuron 413 is weighted heavily, and/or increased by the bias value, thus causing the mathematical function (s) within neuron 409 to generate a higher output, which will have a heavier impact on neurons in the output layer 407. Similarly, if neuron 413 has been determined to be significant to the operations of neuron 409, then the weight in neuron 413 will be increased, such that neuron 409 receives a higher value for the output of the mathematical function in the neuron 413. Alternatively, the output of neuron 409 can be minimized by decreasing the weight and/or bias used to affect the output of neuron 409. These weights/biases are adjustable for one, some, or all of the neurons in the DNN 424, such that a reliable output will result from output layer 407. In one or more embodiments of the present invention, finding the values of weights and bias values is done automatically by training the neural network. In one or more embodiments of the present invention, manual adjustments are applied to tune the hyperparameters such as learning rate, dropout, regularization factor and so on. As such, training a neural network involves running forward propagation and backward propagation on multiple data sets until the optimal weights and bias values are achieved to minimize a loss function. The loss function measures the difference in the predicted values by the neural network and the actual labels for the different inputs.

When manually adjusted, the weights are adjusted by the user, sensor logic, etc. in a repeated manner until the output from output layer 407 matches expectations. For example, assume that input layer 403 receives inputs that describe a certain type of utterance. In an exemplary input, the input to input layer 403 contains values that describe that type of utterance. If DNN 424 has been properly trained (by adjusting the mathematical function (s), output value(s), weight(s), and biases in one or more of the electronic neurons within DNN 424) to output a 5-tuple output vector (e.g., 0.2, 0.9, 0.2, 0.3, 0.4) to the output layer 407, indicating that the neuron 404 that is associated with the label "tech support" has the highest value (0.9), then it indicates that the utterance 400 describes (is related) to a question or answer about tech support for a product.

When automatically adjusted, the weights (and/or mathematical function) are adjusted using "back propagation", in which weight values of the neurons are adjusted by using a "gradient descent" method that determines which direction each weight value should be adjusted to. This gradient descent process moves the weight in each neuron in a certain direction until the output from output layer 407 improves (e.g., gets closer to outputting a highest value to neuron 404, thus indicating that the utterance 400 is related to tech support).

As shown in FIG. 5, a DNN 524 (analogous to DNN 424 shown in FIG. 4) is trained to rank answers to a particular question (e.g., utterance 400 shown in FIG. 4) based on the intent (see intent labels 402 in FIG. 4) and entities (e.g., certain words, phrases, terms, etc.) in that particular question.

Thus, in an embodiment of the present invention, the intent of the particular question is identified by the process described using DNN 424 in FIG. 4.

The entities in the particular question can be identified using a DNN such as DNN 424 that has been trained to recognize certain terms, nouns, phrases, etc. in an utterance, or by other context-based systems (e.g., natural language processing).

The DNN 524 thus uses as inputs these intent and entities 500, runs them through an input layer 503 (analogous to input layer 403 in FIG. 4), hidden layers 505 (analogous to hidden layers 405 in FIG. 4), and an output layer 507 (analogous to output layer 407 in FIG. 4) to generate answer labels 502. That is, the answer labels 502 identify responses to utterances (e.g., answers to a question, responses to a feedback, etc. —see FIG. 2) which most closely align with the intent and entities 500 for answering a particular question. Thus, in the example shown in FIG. 5, neuron 504, which is associated with the answer associated with the answer label "Product A Tech answer" has a highest output value. As such, "Product A Tech answer" is the label of the answer/response that is most appropriate for an utterance that include the intent and entities 500 found in the user's question and/or the system's response(s).

As described in FIG. 2, the user manually selects one of the answers/utterances from the system as being the one that best meets his/her needs/expectations. As such, in one or more embodiments of the present invention, this selected answer is input into a DNN, which then modifies one or more rules.

For example, consider DNN 624 (analogous to DNN 424 shown in FIG. 4), as shown in FIG. 6. DNN 624 uses the selected answer 600 (chosen by the user) as an input, runs it through an input layer 603 (analogous to input layer 403 in FIG. 4), hidden layers 605 (analogous to hidden layers 405 in FIG. 4), and an output layer 607 (analogous to output layer 407 in FIG. 4) to generate new rules labels 602. Various rules are identified in one or more of the neurons within DNN 624. Thus, the new rules labels 602 not only identify which rules are modified by the selected answer 600, but also ranks which rules are most appropriate for being modified, based on their association with certain neurons from the output layer 607. Thus, in the example shown in FIG. 6, neuron 604, which is associated with the new rules label "New rule for Product A tech request", is identified as the new rule that is most appropriate for being changed, based on the user's selection in FIG. 2 of the utterance U2b-c ("Let me get you tech support for help with Software Product A"), as depicted in selected answer 600 as an input to DNN 624.

In an embodiment of the present invention, a subject matter expert (SME) is notified that the old rule for Product A tech request needs to be updated, based on the selected answer 600. However, in a preferred embodiment, the DNN 624 actually modifies this old rule using logic within DNN 624. That is, assume that the neurons input layer 603 includes values that represent various aspects of the old rule, such as what entities to look for in an utterance, what the intent of a particular rule is, who provides the utterance (e.g., a user of a chat bot), etc. The DNN 624 then compares these rule attributes to attributes from the selected answer 600, thus resulting in the generation of a vector in neuron 604 that represents the new rule for Product A tech request.

Figure 7:
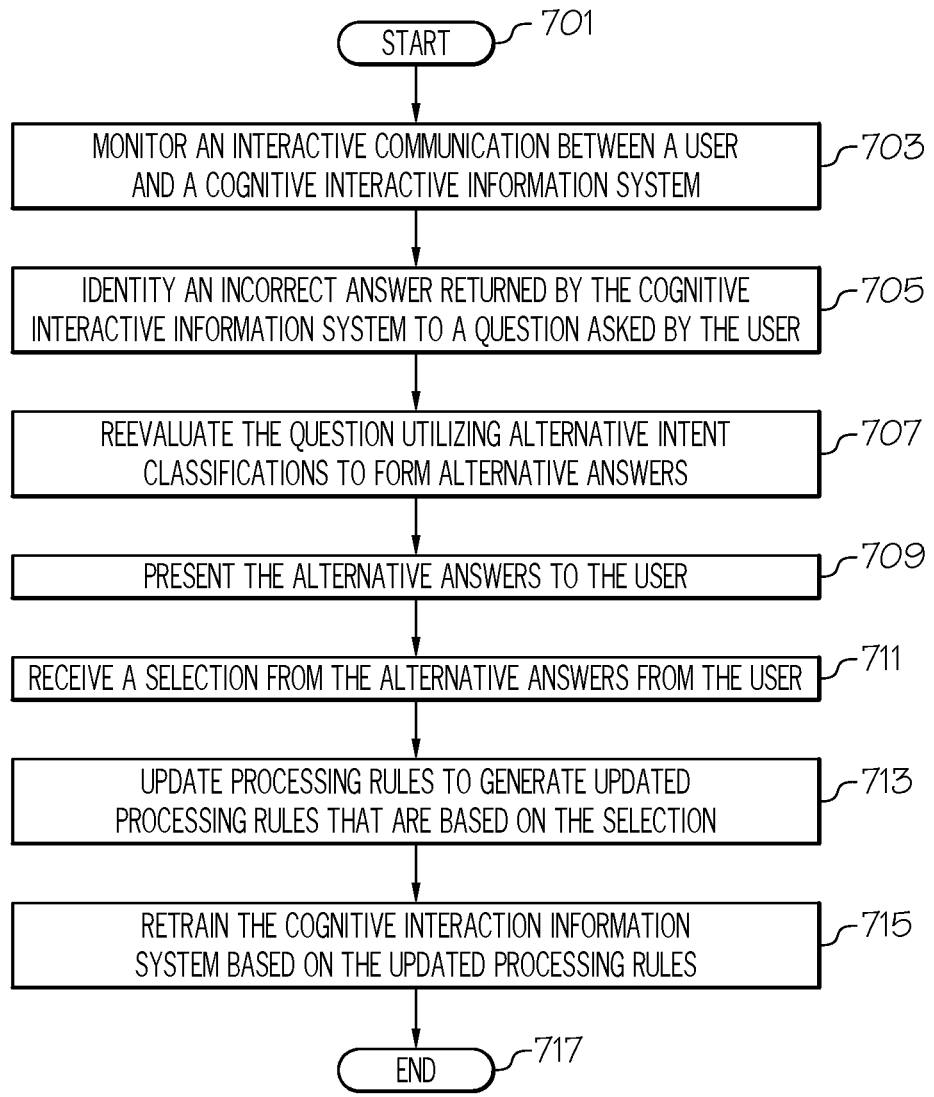
FIG. 7 is a high-level flow chart of one or more steps performed in accordance with one or more embodiments of the present invention.
Figure 8:
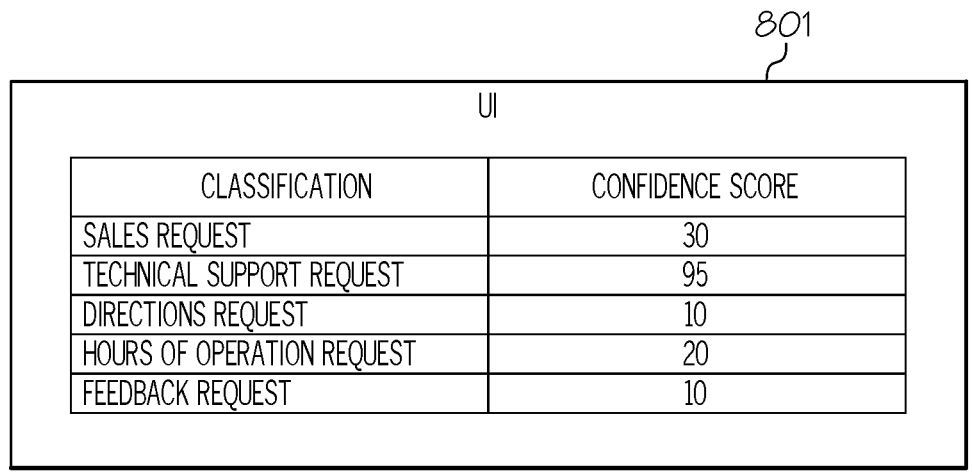
FIG. 8 depicts a user interface that enables a subject matter expert to assign classifications to utterances in accordance with one or more embodiments of the present invention.

With reference now to FIG. 7, a high-level flow chart of one or more operations performed by one or more embodiments of the present invention is presented. In one or more embodiments, some or all of the operations described in FIG. 7 are performed by one or more processors (e.g., processor 104 shown in FIG. 1).

After initiator block 701, a system (e.g., computer 102 shown in FIG. 1) monitors an interactive communication between a user (e.g., of client computer 152) and a cognitive interactive information system (e.g., machine learning system), as described in block 703. For example, and in an embodiment of the present invention, computer 102 monitors the chat session between a user and a chat bot, as shown in FIG. 2.

As described in block 705, the system identifies an incorrect answer returned by the cognitive interactive information system to a question asked by the user. For example, the system sees the response/utterance from the user shown in FIG. 2 "NO! I already own Software Product A. I cannot get it to work." (U1 b), and realizes that this is a negative reaction to the initial response provided by the chat bot.

As described in block 707, the system then reevaluates the user's original question utilizing alternative intent classifications to form alternative answers, such as those shown in FIG. 2.

As described in block 709, the system the presents the alternative answers (e.g., utterances U2b-a, U2b-b, U2b-c shown in FIG. 2) to the user.

As described in block 711, the system then receives a selection from the alternative answers from the user (e.g., utterance U2b-c from FIG. 2).

As described in block 713, the system updates processing rules to generate updated processing rules that are based on the selection (see FIG. 6).

As described in block 715, the system then retrains the cognitive interaction information system based on the updated processing rules (see FIGS. 4-6).

The flow chart ends at terminator block 717.

In an embodiment of the present invention, the system (e.g., computer 102 and/or machine learning system 124 shown in FIG. 1) generates vectors that represent a ground truth utterance and the question. That is, the ground truth utterance is known to accurately convey what is attempting to be asked in the question from the user. The vector for the ground truth utterance and the vector for the question from the user are compared, leading to a confidence score regarding what the user intended to ask. That is, if the user's question closely matches the ground truth utterance, then the vector match (vector score) is high, allowing the system to conclude that the meaning of the user's question is equivalent to that being asked in the ground truth utterance. Once this determination is made, processing rules are updated based on the vector score. Thus, the processing rules in this scenario are updated to recognize the user's new question as being equivalent to the ground truth utterance, and the processing rules direct the machine learning system to recognize the intent and entities from the user's new question to have the same effect as the intent and entities from the ground truth utterance.

In an embodiment of the present invention, the system provides a user interface (UI) that enables a subject matter expert (SME) who is monitoring the chat session to adjust the alternative intent classifications and the confidence score for the question asked by the user; and responsive to the user utilizing the UI with selections that adjust the alternative intent classifications and the confidence score for the question asked by the user, provides answers based on the selections. For example, assume that the system returns to the SME a user interface that provides various classifications (i.e., that describe the intent of the question) and confidence scores for how accurate these classifications are. For example, in the user interface (UI) 801 shown in FIG. 8, the SME is allowed to select a particular classification (describing the intent of the user's question) from the UI 801 as being the appropriate classification for that question. Furthermore, the SME is enabled to submit a confidence score (e.g., from 0-100, based on how confident the SME is about how a particular classification is for describing the user's question). That is, even though the SME is highly confident that the user's question is a request for technical support, there is a chance that it might be about other issues, and thus these other classifications are not entirely eliminated. Thus, the SME is enabled to provide his/her opinion about the classification of the user's question (and his/her confidence in how accurate different classifications for that question are) to the machine learning system (e.g., one or more of the DNNs shown in FIGS. 4-6), which takes this information as an input in order to "tweak" the training of the DNN to recognize intent of an utterance (see FIG. 4), to select answers to a question (see FIG. 5), and/or to modify rules for handling different types of queries based on the answer selected by the user (see FIG. 6).

In an embodiment of the present invention, in which a training answer is associated with a ground truth, the method further comprises: comparing the training answer to the answer selected by the user from the alternative answers; determining that the training answer matches the answer selected by the user from the alternative answers within a predetermined range; and in response to determining that the training answer matches the answer selected by the user from the alternative answers within the predetermined range, returning the answer selected by the user from the alternative answers to the user. That is, if the answer selected by the user closely matches a known answer (training answer) to a particular question, then the answer selected by the user is trusted as being accurate/appropriate, and is returned to the user.

In an embodiment of the present invention, the cognitive interactive information system is a neural network (see FIGS. 4-6).

In an embodiment of the present invention, the system presents to a subject matter expert (SME) the alternative intent classifications, a context of the question, and the updated processing rules that were used by the cognitive interactive information system to find the answer that was selected by the user from the alternative answers. That is, in this embodiment, the SME (in the area of recognizing appropriate answers to questions and/or the programming of cognitive training systems) is presented with the information that the deep neural network used to locate all alternative answers, including the one selected by the user, such that the SME can use these same parameters when checking the work of the deep neural network.

Figure 9:
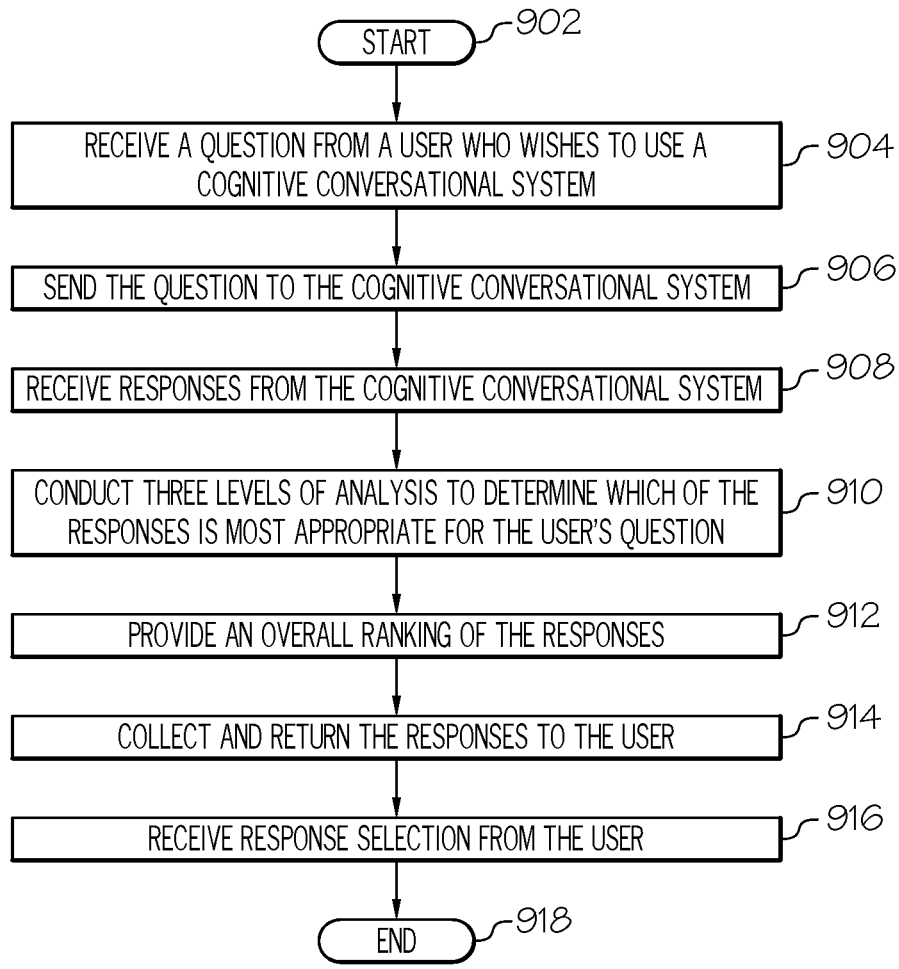
FIG. 9 is another high-level flow chart of one or more steps performed in accordance with one or more embodiments of the present invention.

With reference now to FIG. 9, another high-level flowchart of one or more operations performed by one or more embodiments of the present invention is presented.

After initiator block 902, a user types in a question that they wish to ask of a cognitive interactive information system, as described in block 904. (See also FIG. 2 above.)

As described in block 906, the question is then sent (if not already directly sent) to the cognitive conversational system (e.g., machine learning system 124 shown in FIG. 1).

As described in block 908, the cognitive conversational system returns the response that includes: a. Responses based on the highest confidence classification of intent; b. Extracted entities from the question; c. Context variables set in the system; and d. Alternate classifications the system found, with their confidence score. That is, the cognitive conversational system analyzes the question, and returns initial suggested answers for that question.

As described in block 910, three levels of analysis can be applied in various embodiments of the present invention to determine what responses might be correct.

A first level of analysis uses ranking, in which rankings of responses are based on the confidence score of the alternate classifications returned. That is, the alternate classifications describe the various types/classifications of responses, which are ranked according to how likely they are to be appropriate for responding to the user's question.

A second level of analysis uses a match score, in which the context and extracted entities of the user's question are matched to conditional logic rules for other responses. The more context and extract entities that match, the higher the match score. This allows the system to show the user more possible responses for each classification returned from the conversational system.

A third level of analysis uses cognitive classification. That is, rather than scoring the utterance against intent, the system scores the utterance based on how closely the utterance matches training utterance(s) that have been evaluated to determine their intent, entities, etc. That is, each ground truth utterance is evaluated, in order to generate feature vector scores for the ground truth utterance. A new utterance is then evaluated, in order to generate feature vector scores for the new utterance. The system then uses a distance minimization algorithm over the vectors for the ground truth utterance and the new utterance in order to find the ground truth utterance (s) that the new utterance is closest to.

As depicted in block 912, various embodiments of the present invention use combinations of different analysis methods in order to provide an overall ranking of responses. The system starts by evaluating the utterance with the highest scored classification, and then shows responses based on their match scores using cognitive classification methods. The process then repeats for the next lower scored utterance and repeats until all responses have been evaluated.

As depicted in block 914, responses (e.g., suggested answers and/or other responses to the user's question) are collected and returned to (displayed to) a user. First, the user sees the responses that the system has return, with alternative classifications. These responses are sorted by their confidence levels. Now, the user is enabled to drill down on a classification and see additional responses based on the match score or cognitive classification methods. This allows the user to get to the answer they are looking for as quickly as possible.

As described in block 916, the user sees the response he/she was looking and selects it. In an embodiment of the present invention, the user is also presented with the classification, context, and entity rules uses by the system to find that response. The use can accept or reject that classification to retrain the user's question with the new classification of intent. That is, the user can then use these parameters to refine his/her opinion of the responses, and/or to further train a machine learning system.

The flow chart ends at terminator block 918.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
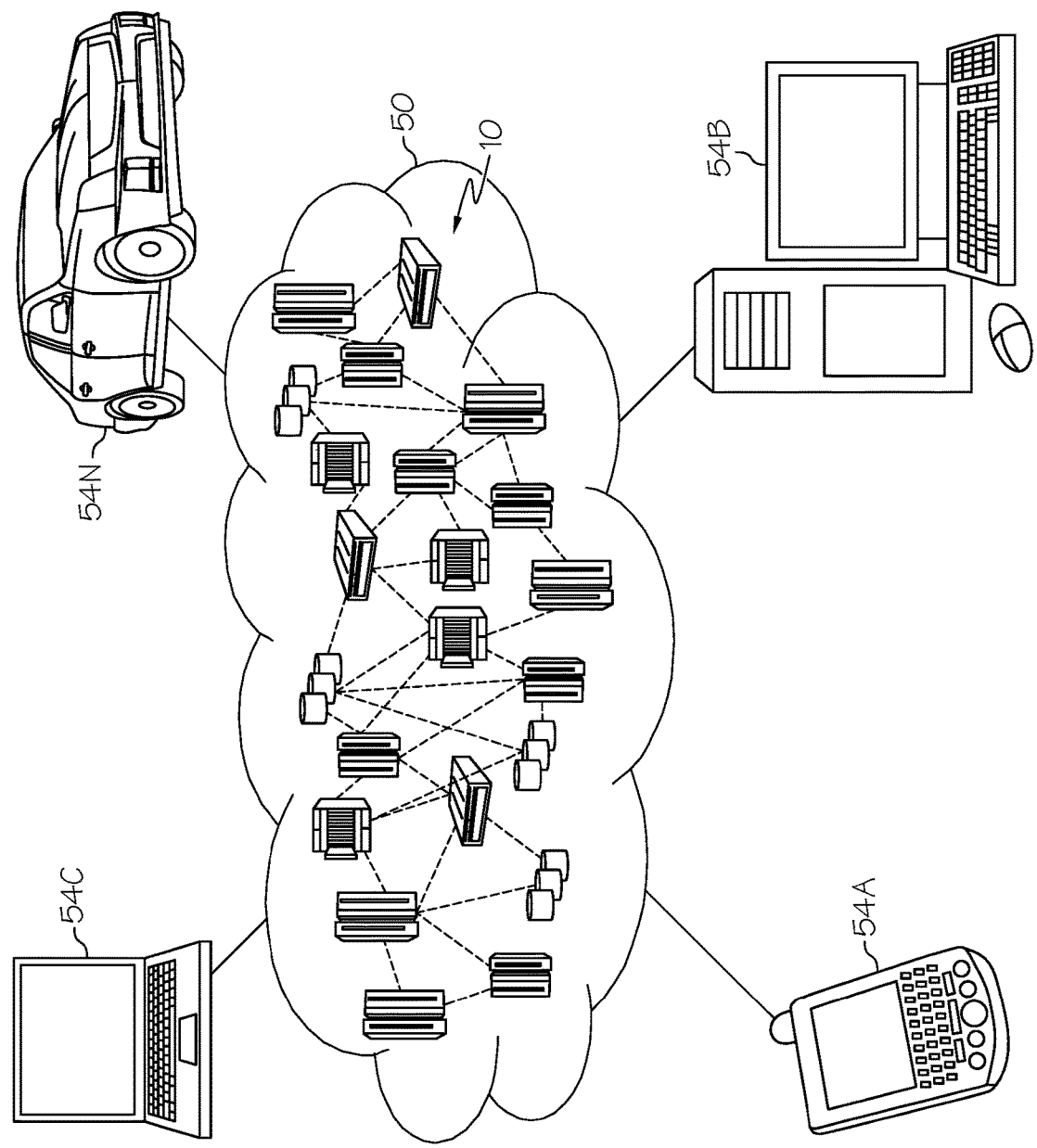
FIG. 10 illustrates a cloud computing environment according to an embodiment of the present invention.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 10 are intended to be illustrative only and that computing nodes 10 and cloud computing environment 50 can communicate with any type of computerized device over any type of network and/or network addressable connection (e.g., using a web browser).

Figure 11:
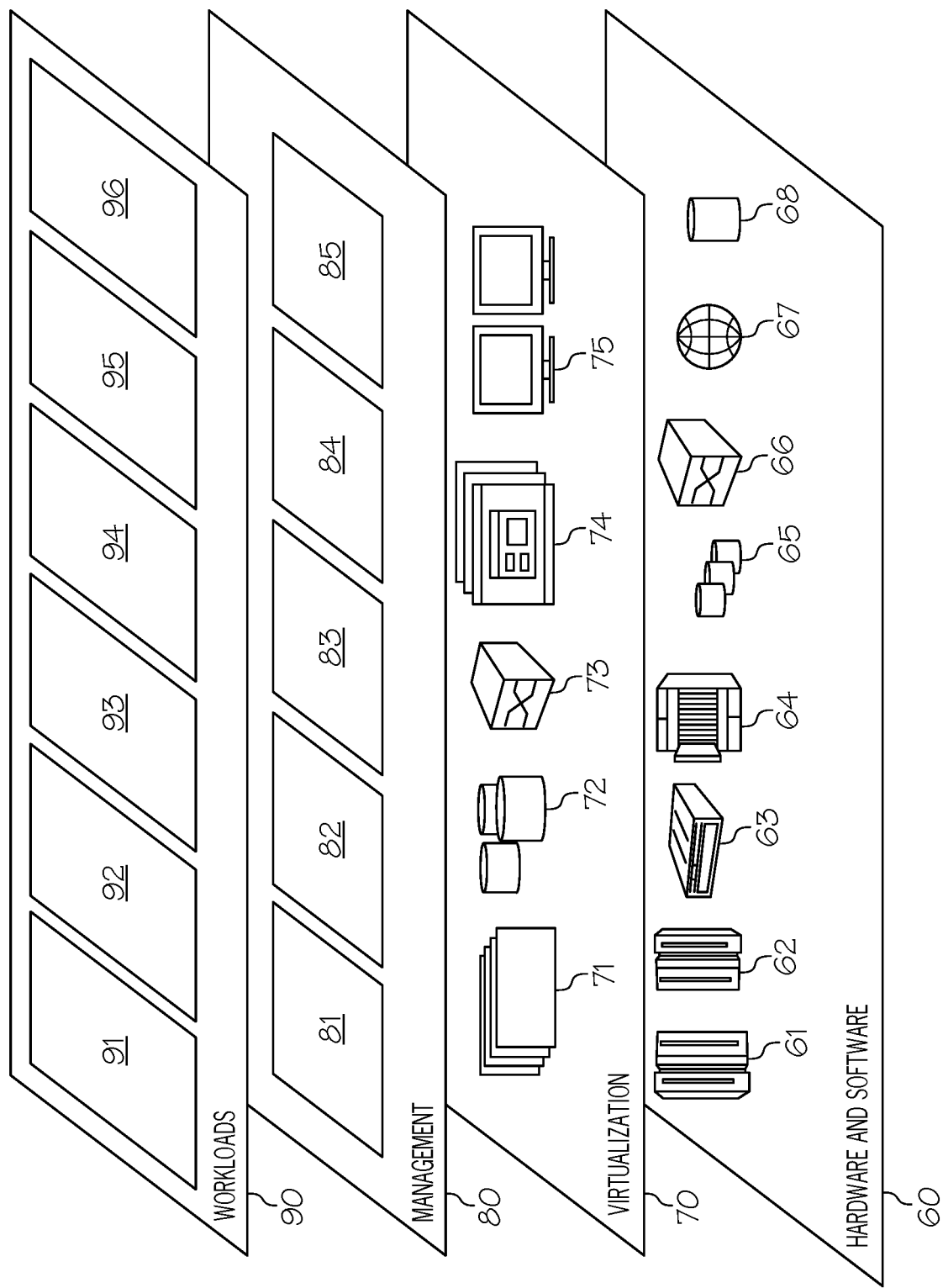
FIG. 11 depicts abstraction model layers of a cloud computer environment according to an embodiment of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and machine learning processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
   identifying an answer returned by a cognitive interactive information system to a question asked by a user, wherein the answer returned by the cognitive information system is selected based, at least in part, on matching an intent classification determined by the cognitive interactive information system to be associated with the question to one or more processing rules;

determining that the answer returned by the cognitive interactive information system to the question asked by the user is incorrect;

reevaluating the question utilizing one or more alternative intent classifications associated with the question to determine one or more alternative answers to the question, wherein the one or more alternative answers are determined based, at least in part, on:

provide a user interface that enables the user to adjust the determined intent classification associated with the question by selecting one or more alternative intent classifications from the user interface and submitting a respective confidence score indicating how confident the user is of a selected alternative intent classification being an accurate intent of the question asked by the user; and responsive to the user utilizing the user interface to select the one or more alternative intent classifications and submit the confidence score indicating how confident the user is of the selected alternative intent classification being an accurate intent of the question asked by the user, determining one or more alternative answers based on matching the alternative intent classifications, starting in order of highest confidence score, to the one or more processing rules;

providing the one or more alternative answers to the question to the user;

receiving a selection of an alternative answer from the one or more alternative answers from the user;

updating processing rules for analyzing a similar question to the question asked by the user based on the processing rules that were used by the cognitive interactive information system to determine the alternative answer selected by the user; and retraining the cognitive interaction information system based on the updated processing rules.

2. The method of claim 1, further comprising:
generating vectors that represent a ground truth utterance and the question;
comparing the vectors to create a vector score;
creating a confidence score for the question asked by the user based on the vector score; and
updating the processing rules based on the vector score.

3. The method of claim 1, wherein a training answer is associated with a ground truth, and wherein the method further comprises:
comparing the training answer to the alternative answer selected by the user from the one or more alternative answers;
determining that the training answer matches the alternative answer selected by the user from the one or more alternative answers within a predetermined range; and
in response to determining that the training answer matches the alternative answer selected by the user from the one or more alternative answers within the predetermined range, returning the alternative answer selected by the user from the one or more alternative answers to the user.

4. The method of claim 1, wherein the cognitive interactive information system is a neural network.

5. The method of claim 1, further comprising:
presenting to a subject matter expert the one or more alternative intent classifications, a context of the question, and the updated processing rules that were used by the cognitive interactive information system to find the alternative answer that was selected by the user from the one or more alternative answers.

6. A computer program product comprising a computer readable storage medium having program code embodied therewith, wherein the program code is readable and executable by a processor to perform a method comprising:
identifying an answer returned by a cognitive interactive information system to a question asked by a user, wherein the answer returned by the cognitive information system is selected based, at least in part, on matching an intent classification determined by the cognitive interactive information system to be associated with the question to one or more processing rules;

determining that the answer returned by the cognitive interactive information system to the question asked by the user is incorrect;

reevaluating the question utilizing one or more alternative intent classifications associated with the question to determine one or more alternative answers to the question, wherein the one or more alternative answers are determined based, at least in part, on:

providing a user interface that enables the user to adjust the determined intent classification associated with the question by selecting one or more alternative intent classifications from the user interface and submitting a confidence score indicating how confident the user is of a selected alternative intent classification being an accurate intent of the question asked by the user; and responsive to the user utilizing the user interface to select the one or more alternative intent classifications and submit the confidence score indicating how confident the user is of the selected alternative intent classification being an accurate intent of the question asked by the user, determining one or more alternative answers based on matching the alternative intent classifications, starting in order of highest confidence score, to the one or more processing rules;

providing the one or more alternative answers to the question to the user;

receiving a selection of an alternative answer from the one or more alternative answers from the user;

updating processing rules for analyzing a similar question to the question asked by the user to generate updated processing rules that are based on the processing rules that were used by the cognitive interactive information system to determine selection of the alternative answer selected by the user; and retraining the cognitive interaction information system based on the updated processing rules.

7. The computer program product of claim 6, wherein the method further comprises:
generating vectors that represent a ground truth utterance and the question;
comparing the vectors to create a vector score;
creating a confidence score for the question asked by the user based on the vector score; and
updating the processing rules based on the vector score.

8. The computer program product of claim 6, wherein a training answer is associated with a ground truth, and wherein the method further comprises:
comparing the training answer to the alternative answer selected by the user from the one or more alternative answers;

determining that the training answer matches the alternative answer selected by the user from the one or more alternative answers within a predetermined range; and in response to determining that the training answer matches the alternative answer selected by the user from the one or more alternative answers within the predetermined range, returning the alternative answer selected by the user from the one or more alternative answers to the user.

9. The computer program product of claim 6, wherein the cognitive interactive information system is a neural network.

10. The computer program product of claim 6, wherein the method further comprises:

presenting to a subject matter expert the one or more alternative intent classifications, a context of the question, and the updated processing rules that were used by the cognitive interactive information system to find the alternative answer that was selected by the user from the one or more alternative answers.

11. The computer program product of claim 6, wherein the program code is provided as a service in a cloud environment.

12. A computer system comprising one or more processors, one or more computer readable memories, and one or more computer readable non-transitory storage mediums, and program instructions stored on at least one of the one or more computer readable storage mediums for execution by at least one of the one or more processors via at least one of the one or more computer readable memories, the stored program instructions executed to perform a method comprising:

identifying an answer returned by a cognitive interactive information system to a question asked by a user, wherein the answer returned by the cognitive information system is selected based, at least in part, on matching an intent classification determined by the cognitive interactive information system to be associated with the question to one or more processing rules;

determining that the answer returned by the cognitive interactive information system to the question asked by the user is incorrect reevaluating the question utilizing one or more alternative intent classifications associated with the question to determine one or more alternative answers to the question, wherein the one or more alternative answers are determined based, at least in part, on:

providing a user interface that enables the user to adjust a current the determined intent classification associated with the question by selecting one or more alternative intent classifications from the user interface and submitting a respective confidence score indicating how confident the user is of a selected alternative intent classification being an accurate intent of the question asked by the user; and responsive to the user utilizing the user interface to select the one or more alternative intent classifications and submit the confidence score indicating how confident the user is of the selected alternative intent classification being an accurate intent of for the question asked by the user, determining one or more alternative answers based on matching the alternative intent classifications, starting in order of highest confidence score, to the one or more processing rules;

providing the one or more alternative answers to the question to the user;

receiving a selection of an alternative answer from the one or more alternative answers from the user;

updating processing rules for analyzing a similar question to the question asked by the user based on the processing rules that were used by the cognitive interactive information system to determine selection of the alternative answer selected by the user; and retraining the cognitive interaction information system based on the updated processing rules.

13. The computer system of claim 12, wherein the method further comprises:

generating vectors that represent a ground truth utterance and the question;

comparing the vectors to create a vector score;

creating a confidence score for the question asked by the user based on the vector score; and updating the processing rules based on the vector score.

14. The computer system of claim 12, wherein a training answer is associated with a ground truth, and wherein the method further comprises:

comparing the training answer to the alternative answer selected by the user from the one or more alternative answers;

determining that the training answer matches the alternative answer selected by the user from the one or more alternative answers within a predetermined range; and in response to determining that the training answer matches the alternative answer selected by the user from the one or more alternative answers within the predetermined range, returning the alternative answer selected by the user from the one or more alternative answers to the user.

15. The computer system of claim 12, wherein the cognitive interactive information system is a neural network.

16. The computer system of claim 12, wherein the method further comprises:

presenting to a subject matter expert the one or more alternative intent classifications, a context of the question, and the updated processing rules that were used by the cognitive interactive information system to find the alternative answer that was selected by the user from the one or more alternative answers.

17. The computer system of claim 12, wherein the stored program instructions are provided as a service in a cloud environment.

* * * * *